Figure 1:
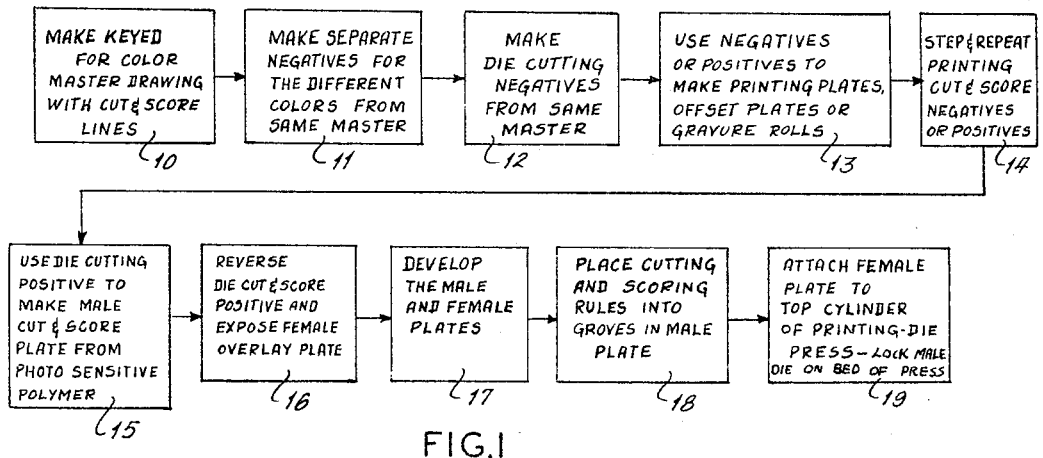

Nov. 8, 1966    W. J. KLETZKER    3,283,617
PROCESS OF MAKING DIE CUTTING PLATES
Filed June 1, 1964    2 Sheets-Sheet 1

INVENTOR.
WALLACE J. KLETZKER
BY
Gravely, Lieder & Woodruff

Nov. 8, 1966  W. J. KLETZKER  3,283,617
PROCESS OF MAKING DIE CUTTING PLATES
Filed June 1, 1964
2 Sheets-Sheet 2

INVENTOR.
WALLACE J. KLETZKER
BY
Gravely, Lieder & Woodruff

United States Patent Office 3,283,617
Patented Nov. 8, 1966

3,283,617
PROCESS OF MAKING DIE CUTTING PLATES
Wallace J. Kletzker, St. Louis County, Mo.
(7 Laymont Court, St. Louis, Mo.)
Filed June 1, 1964, Ser. No. 371,296
12 Claims. (Cl. 76—107)

The present invention relates to a process of making die cutting plates, and in particular, relates to a method of making die cutting plates for paperboard cartons using the same master drawing as is used for making plates for printing the cartons.

Heretofore, die cutting plates have been made in a time consuming, complicated, and inefficient method wherein a layout of the blank including all of the cut and score lines is transferred on plywood by the die maker, a scroll saw is used to cut along all of the lines, and the cutting and scoring dies are positioned in the scroll cuts by hand using trial and error procedures.

This method has the disadvantages of requiring two copy masters to be made, one for the engraver which is used in making the plates for printing all of the colors on the carton; and the second by the die maker, which is used in making the cutting and scoring die. Another disadvantage of the present method of cutting and scoring paperboard cartons is that pressure tape or other material must be secured by hand to the upper cylinder in the printing press in the outline of the die cuts and coincident with the die cuts so that sufficient pressure is applied to the back of the paperboard to cause the dies to cut and score properly. This too is a time consuming trial and error hand operation.

Another difficulty in the conventional method is that when a plurality of dies are placed on the same base, each individual die must be individually cut and there is no assurance that they will be identical. Using this procedure, it is difficult to register the dies to the printing plates.

Therefore, one of the principal objects of the present invention is to provide a method of making scoring and cutting dies using the same copy master and photographic techniques as the engraver uses in setting up the printing plates for making paperboard cartons.

Another object of the present invention is to provide a method of making cutting and scoring dies wherein a plate which is attached to the upper cylinder is made from the same copy master as is used to form the cutting and scoring die base merely by reversing the image.

A further object of the present invention is to provide a method of making a cutting and scoring die which is keyed to the color printing plates and which can be stepped and repeated to provide a plurality of identical dies on the same basis.

In the recently issued patent to C. R. Giese, 3,109,328, a method of making a female die for a paperboard carton blanking die is shown. This patent utilizes a previously constructed male die, which is made by the conventional method hereinbefore described, and takes a photographic image of this, prints this on a photosensitive plate, etches the plate, and uses the plate as a female blanking die.

Although the Giese patent discloses some improvement over the conventional processes, it still requires that the initial male cutting die be formed by hand from a second copy master (which is not keyed to the printing master) and therefore fails to achieve the practical results of the present invention.

The present invention comprises a process of making male and female dies for making paperboard cartons from the basic artwork copy master which is used by the engraver in making the printing plates, offset plates, or gravure rolls.

Figure 2:
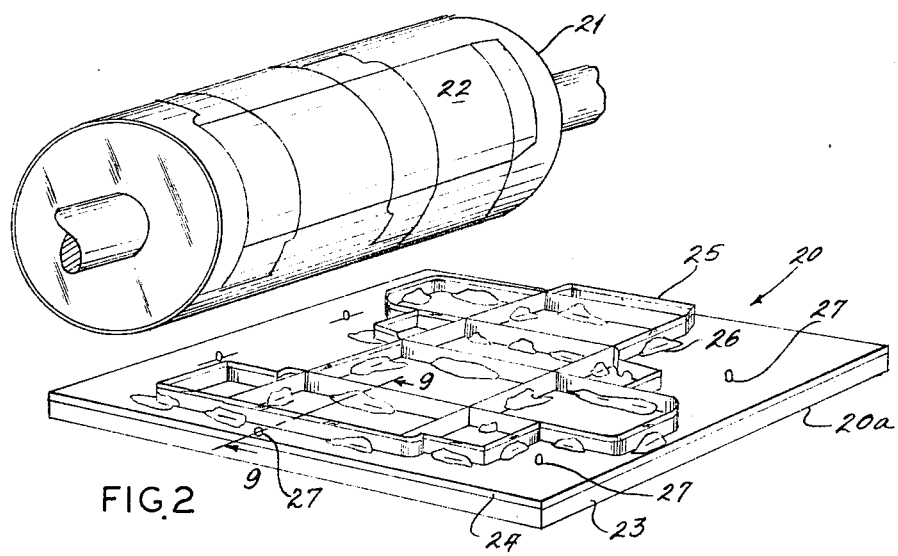
Figure 3:
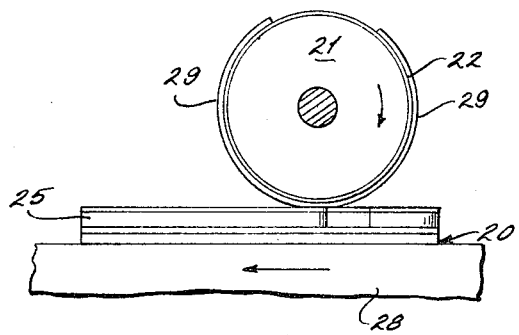
Figure 4:
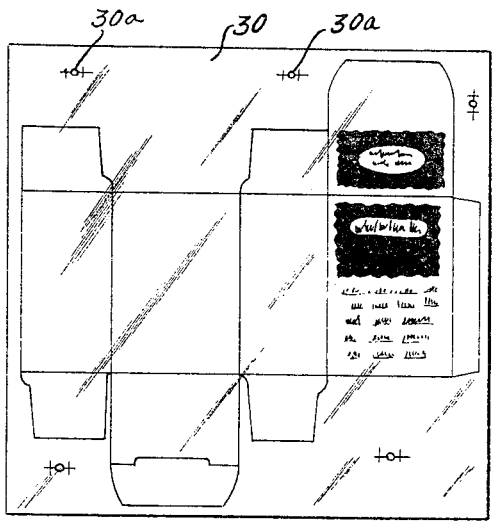
Figure 10:
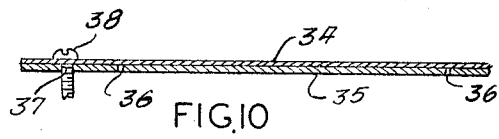
Figure 9:
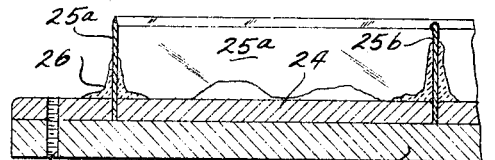
Figure 7:
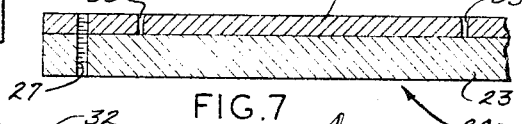
Figure 5:
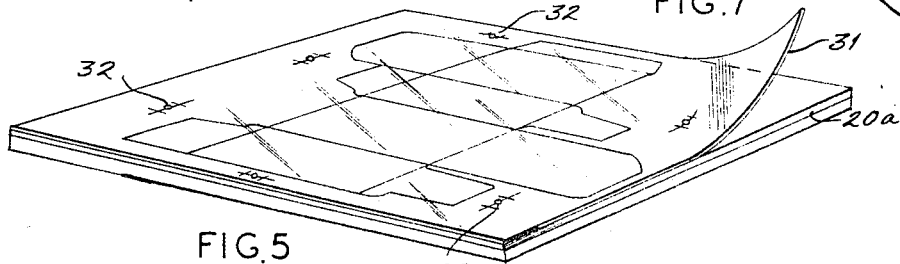
Figure 6:
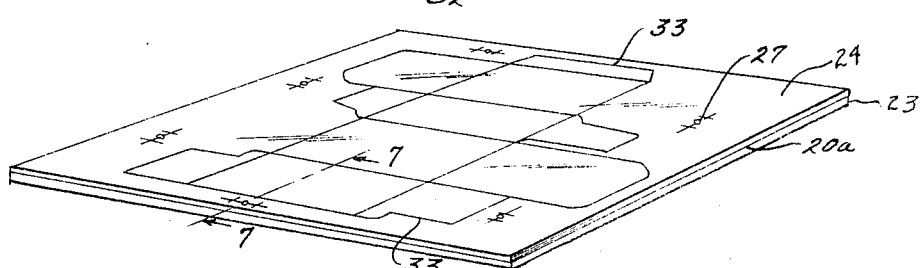
Figure 8:
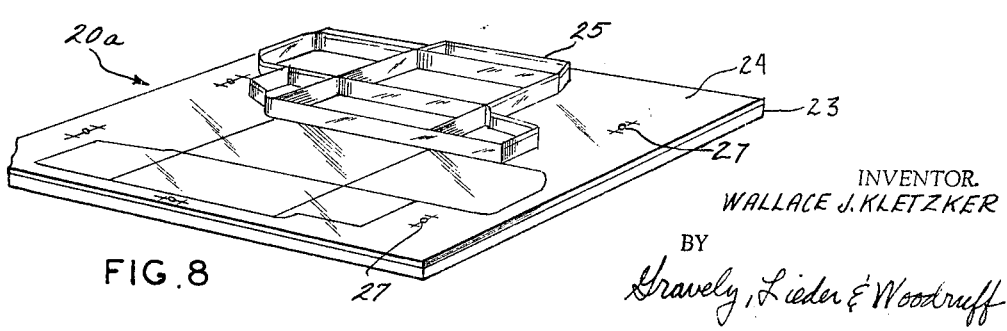

In the drawings, wherein like numbers refer to like parts wherever they occur:

FIG. 1 is a diagrammatic block diagram showing the steps of the present process, FIG. 2 is a perspective view showing an impression cylinder and a scoring die set in place, FIG. 3 is a side elevational view showing a paperboard carton laid on a die, FIG. 4 is a plan view of a copy master partly showing the outline of a paperboard carton, with the artwork type and register marks in place, FIG. 5 is a perspective view showing a positive of the cutting and scoring die and showing the register marks placed thereon, FIG. 6 is a perspective view showing a photographic plastic plate having the outline of the cutting and scoring lines printed thereon, FIG. 7 is a fragmentary sectional view taken along line 7—7 of FIG. 6 and showing the lines grooved in the photographic plate, and a threaded register hole, FIG. 8 is a perspective view of a portion of the scoring and cutting rules placed in the grooved plate shown in FIG. 6, FIG. 9 is a fragmentary sectional view taken along line 9—9 of FIG. 2 showing scoring and cutting rules and a register hole, and FIG. 10 is a fragmentary sectional view of a female plate in inverted position placed in a position of register with the male die shown in FIG. 9.

In the present process, the engraver prepares the color printing plates and the male and female dies for cutting and scoring the paperboard cartons. Initially, the engraver starts with a layout drawing of the outline of the box showing the score and cut lines for the various box panels. Artwork, type and register marks are added to this drawing to make it a keyed for color master drawing. These steps are generally indicated by the number 10 in FIG. 1. Separate negatives or positives are made from this master for each of the different colors, with each color negative also showing the register marks (Block 11 of FIG. 1). Separate printing plates for each color are engraved from these negatives (Block 13 of FIG. 1).

A die cutting negative showing the outlines of the cut and score lines is made from the same master key drawing as is used in making the printing negatives (Block 12 of FIG. 1), and includes the same register marks as the printing negatives. The lines on this negative normally are made the width of the score lines.

A positive is made of the cut and score line negative (Block 13 of FIG. 1) and the lines can be thickened when making this positive by placing sheets of acetate of different thicknesses between the negative and the positive and circling the light around, to acquire the proper width groove in the photosensitive layer to fit the point gage rule desired.

All of the positives or negatives can be stepped and repeated as often as necessary (Block 14 of FIG. 1) depending on the size of the printing presses, the particular step and repeat equipment that the engraver has and, of course, the size of the cartons. Negatives or positives are available for either printing processes, letterpress, offset or gravure. In the present invention, wherein a light sensitive polymer plastic plate on a metal backing is used, a positive of the cut and score die is necessary. This positive is exposed on a light sensitive polymer plastic to form the outline of the cut and score lines in the male plate (Block 15 of FIG. 1). To make the female overlay plate, the positive of the cut and score lines is reversed and a second thinner photosensitive plastic plate is exposed. (Block 16 of FIG. 1.) This plate is a mirror image of the bottom male plate.

When the photosensitive plastic plates have been exposed with the outline of the cut and score positive, the plates are developed (Block 17 of FIG. 1) by washing out the unexposed lines with a developing solution.

The register marks on the male plate should be punched or drilled with a 3/16 hole and tapped for a 10–32 screw. A sheet of paperboard should be temporarily fastened to the back of the female plate and the register marks punched with a 3/16 hole.

In making the bottom male die, the cutting and scoring rules are placed in the slots, washed out in the photosensitive plate and anchored therein with a suitable adhesive, such as epoxy (Block 18 of FIG. 1). After the dies are lined up, additional adhesive or filler may be poured into the die to hold the rules permanently and securely in place. While the resin is still soft, the female plate is applied to the top of the male die so that the register holes are aligned and screws applied through the register holes to hold the dies and rules firmly in position. This securely lines up the rules. The male plate or die and the female plate with the punched paperboard therebetween are bolted together and placed on the press bed (Block 19 of FIG. 1). The cylinder is brought in contact with the plates and advanced far enough for the gripping or locking device to be attached to the female plate. As the plates advance with the bed, the screws are removed. This insures that the upper cylinder and the attached female plate are registered with the cutting die or bottom plate.

With this arrangement, the printer merely runs the paperboard between the cutting die and the cylinder to score and cut the finished and printed paperboard cartons.

FIG. 2 is a perspective view of the present invention showing a single cutting and scoring die 20 and an upper cylinder 21 having a female plate 22 secured thereto. The male cutting and scoring die 20 comprises a plate 20a having a metal base 23 and a light sensitive photopolymer upper layer 24 applied and firmly attached thereto. This product is made by du Pont and sold under the trade name DYCRIL. Embedded therein are the cutting and scoring rules 25 which are secured to the photopolymer 24 by suitable patches of adhesive 26. Register holes 27 are positioned in the die 20.

As shown in FIG. 3, the male cutting and scoring die 20 is positioned on a suitable printing die press 28 so that the cutting and scoring rules 25 are positioned upwardly. The previously printed carton blank 29 rolls around with the cylinder 21 having the female overlay plate 22 attached thereto pressing the paperboard 29 toward the upper edges of the cutting and scoring rules 25 so that the paperboard cartons are suitably cut and scored. The movement of the cylinder 21 and the press bed 28 are indicated by the arrows of FIG. 3.

FIGS. 4, 5 and 6 show steps in the process of making the dies shown in FIG. 2. FIG. 4 shows a keyed for color master drawing 30 with the cut and score lines of the paperboard carton panels also indicated thereon. The master 30 is used to make all of the printing plates for the various colors, and in addition is used to make the male dies and female overlays for the cutting and scoring of the paperboard cartons.

The master drawing 30 is conventional in the art and as shown indicates only in a general manner the construction thereof. As shown, the panels are not drawn up to the cut and score lines, but the wavey edge indicates to the engraver that the color shown goes to the edge of the panel. The lettering, etc. also is shown on this drawing 30.

FIG. 5 shows a positive 31 of the cut and score lines of the master drawing 30 shown in FIG. 4 positioned on the photosensitive polymer plate 20a. The register marks 32 on the positive 31 are the same as the register marks 30a on the master 30, and are carried through on all of the printing plates.

FIG. 6 shows the photosensitive plate 20a of FIG. 5 after the exposed cut and score lines 33 have been developed with a solution of 180 cc. of caustic soda in 25 gallons of water which is applied at about 45 lbs. pressure as a spray. The photopolymer layer 24 is light sensitive and is prepared for printing by being placed in an atmosphere free of $CO_2$ for two hours or more. These characteristics, of course, are peculiar to the duPont DYCRIL product and other light sensitive plastics would have to be treated according to the instructions of the manufacturer. However, the particular composition and processing of the material forms no part of the present invention, and only the engraving process is claimed herein.

To form the top or female plate 22 for attaching to the upper cylinder 21 as an overlay, the positive 31 is exposed through the other side. After developing this makes the female plate 22 which is applied to the upper cylinder 21.

The register marks 27 on the plate 20a are in line with the register marks 30a on the master 30.

FIG. 7 shows the plate 20a comprising the bottom metal base 23 and the upper layer of photosensitive plastic 24. The grooves 33 for the cutting and scoring rules are washed out in the photosensitive polymer 24 directly to the metal base 23. The register marks 27 are drilled or punched completely through the metal base 23 and the plastic layer 24 and are threaded.

FIG. 8 shows the base 20a having some of the cutting and scoring rules 25 positioned therein.

FIG. 9 shows the cutting rules 25a having sharpened edges and the scoring rules 25b having rounded edges and on a plane slightly below the uppermost edges of the cutting rules 25a anchored in the polymer 24 by means of a suitable adhesive 26 which may be an epoxy or the like.

FIG. 10 shows a female plate 22 which also comprises a metal substrate 34 of less thickness than the metal substrate 23 for the male plate 20a, and a photosensitive polymer layer 35 attached thereto and having grooves 36 which are aligned with the rules 25 fixed in the male plate 20a. Register holes 37 in the female plate 22 are aligned with the male plate register holes 27. Register screws 38 are adapted to be threaded into the holes 27 to register the plates 20a and 22.

As mentioned, the female plate 22 is made from the same positive 31 as the male plate 20a, but is exposed through the opposite side of the positive 31. Thus a reverse or mirror image is made, so that the grooves 36 in the female plate 22 coincide with the rules 25 of the male plate 20a.

The female plate 22 is attached to the cylinder 21 by suitable means depending on the particular structure of the printing press used by the printer.

In aligning the male and female plates, the male cutting and scoring die 20 is positioned on the press 28, the female plate 22 is laid on top of the rules 25 attached to the male plate 20a, and the male plate register holes 27 are aligned with the female plate register holes 37 by the register screws 38. The male plate or die 20a with the punched paperboard between it and the female plate 22 are bolted together and placed on the bed of the press 28. The cylinder 21 is brought in contact with the upper plates 22 and advanced far enough for the gripping or locking device to be attached to the female plate 22. The plates are advanced, and the screws removed as the bed 28 advances. Any pulling or buckling would indicate packing on the cylinder or underlay for the bed. After a press has been zeroed in, the same thicknesses would be standard and allowances can be made for various thicknesses of paperboard.

Thus it is seen that the present invention provides a process of making cutting and scoring dies which achieves all of the objects and advantages sought therefor.

This invention is intended to cover all changes and modifications of the examples of the invention herein chosen for purposes of the disclosure, which do not constitute departures from the spirit and scope of the invention.

What is claimed is:
1. A method of making die cutting plates including the steps of
   (A) making a photographic reproduction of the cut and score lines of a container blank,
   (B) forming said reproduction on a substrate,
   (C) grooving said substrate in the outline of said cut and score lines of the container blank, and
   (D) fixing cutting and scoring rules in the grooves to form a male die.
2. The method of claim 1 including the steps of reversing the photographic reproduction, forming said reversed reproduction on a substrate, and grooving the substrate to form a female overlay which is the mirror image of the male die.
3. The process of claim 2 wherein the substrates each include a base member having a layer of photosensitive polymer plastic coated thereon and the photographic reproduction is a positive.
4. A process of making paperboard cartons including the steps of
   (A) making a master outline, including register marks of the cut and score lines of a paperboard carton,
   (B) making printing plates, including register points, from the master outline, and
   (C) making a male cutting and scoring die from the same master outline including the same register points as the printing plates,
   (D) making a female overlay from a reversal of the master outline,
   (E) positioning the male die and the female overlay on a press with the female overlay vertically aligned with the male die, and
   (F) passing printed paperboard cartons through the press to cut and score the cartons.
5. A process of making paperboard cartons including the steps of
   (A) making a master outline of the cut and score lines of a paperboard carton,
   (B) making printing plates from the master outline,
   (C) making a photographic reproduction of the master outline,
   (D) exposing a plate, including a substrate and a photosensitive layer, through the reproduction,
   (E) grooving the exposed plate along the cut and score lines developed thereon,
   (F) anchoring cutting and scoring rules in the grooves of the plate to form a male die,
   (G) making a matching female overlay from a reversal of the master outline,
   (H) aligning the male die and the female overlay on a press,
   (I) attaching the female overlay to a cylinder vertically aligned with the male die, and
   (J) passing printed paperboard cartons through the press to cut and score the cartons.
6. A process of making paperboard cartons including the steps of making a master outline of the cut and score lines of a paperboard carton; making printing plates from the master outline; making a photographic reproduction of the master outline; exposing a plate, including a substrate and a photosensitive layer, through the reproduction; grooving the exposed plate along the cut and score lines developed thereon; anchoring cutting and scoring rules in the grooves of the plate to form a male die; reversing the reproduction and exposing a second plate having a photosensitive layer and grooving the second plate along the cut and score lines developed thereon to form a matching female overlay.

7. The process of claim 6 wherein the plates include a metallic substrate and a photosensitive polymer plastic layer.
8. The process of claim 6 wherein the master outline includes register marks which are carried through to the printing plates and the male die and female overlay.
9. The process of claim 6 including the steps of aligning the male die and the female die on a press, attaching the female overlay to a cylinder vertically aligned with the male die, and passing printed paperboard cartons through the press to cut and score the cartons.
10. A process of making paperboard cartons including the steps of
    (A) making a master outline, including register marks, of the cut and score lines of a paperboard carton,
    (B) making printing plates, including register marks, from the master outline,
    (C) making a positive reproduction, including register marks, of the master outline,
    (D) exposing a plate, including a substrate and a photosensitive polymer plastic layer, through the positive reproduction,
    (E) grooving the exposed plate along the cut and score lines developed thereon,
    (F) forming register holes in the plate in alignment with the register marks on the master outline,
    (G) anchoring cutting and scoring rules in the grooves of the plate to form a male die,
    (H) reversing the reproduction and exposing a second plate having a photosensitive layer through the positive,
    (I) grooving the second plate along the cut and score lines developed thereon to form a matching female overlay,
    (J) forming register holes in the second plate in alignment with the holes in the first plate,
    (K) aligning the male die and the female overlay in a press,
    (L) attaching the female overlay to a cylinder vertically aligned with the male die, and
    (M) passing printed paperboard cartons through the press to cut and score the cartons.
11. A cutting and scoring die comprising a metal substrate, a developed photosensitive polymer layer firmly attached thereto, said layer having straight sided grooves positioned therein, and cutting and scoring rules firmly anchored in the grooves.
12. The structure of claim 11 including a synthetic adhesive anchoring the rules in the grooves.

References Cited by the Examiner
UNITED STATES PATENTS

| | | | |
|---|---|---|---|
| 2,166,366 | 7/1939 | Norris. | |
| 2,172,970 | 9/1939 | Ford | 76—107 |
| 2,369,960 | 2/1945 | Gage et al. | 76—107 |
| 2,743,629 | 5/1956 | Pellegrino et al. | 76—107 |
| 3,109,328 | 11/1963 | Giese | 76—107 |
| 3,142,233 | 7/1964 | Downie | 76—107 X |

GRANVILLE Y. CUSTER, JR., *Primary Examiner.*